(12) United States Patent
Kuo

(10) Patent No.: US 7,573,707 B2
(45) Date of Patent: Aug. 11, 2009

(54) DOCKING STATION FOR PORTABLE COMPUTER

(75) Inventor: Szu-Wei Kuo, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 249 days.

(21) Appl. No.: 11/518,265

(22) Filed: Sep. 7, 2006

(65) Prior Publication Data
US 2007/0127205 A1 Jun. 7, 2007

(30) Foreign Application Priority Data
Dec. 1, 2005 (CN) .................. 2005 2 0119950

(51) Int. Cl.
*G06F 1/16* (2006.01)
(52) U.S. Cl. .................. 361/679.41; 710/303; 345/156; 320/116

(58) Field of Classification Search ................. 345/156; 710/303; 165/104.33; 439/607; 320/116; 361/679–687, 724–727
See application file for complete search history.

(56) References Cited

U.S. PATENT DOCUMENTS

| 6,784,870 | B2 * | 8/2004 | Yin ........................... 345/156 |
| 7,382,611 | B2 * | 6/2008 | Tracy et al. ................. 361/686 |
| 2008/0002353 | A1 * | 1/2008 | Carnevali ..................... 361/686 |

FOREIGN PATENT DOCUMENTS

TW          568419          12/2003

* cited by examiner

*Primary Examiner*—Hung V Duong
(74) *Attorney, Agent, or Firm*—Wei Te Chung

(57) ABSTRACT

A docking station for a portable computer includes a connector and a keyboard. The connector is disposed on a bottom portion of the docking station for communicating with the portable computer, and the keyboard is disposed on a top portion of the docking station.

17 Claims, 4 Drawing Sheets

DOCKING STATION FOR PORTABLE COMPUTER

BACKGROUND OF THE INVENTION

1. Field of the Invention

The present invention relates to a docking station, and more particularly to a docking station for a portable computer.

2. Description of Related Art

With the development of computer technology, use of portable computers has become widespread because of their relatively small size and portability. However, to achieve small-sized portable computers, many typically included expansion ports are not included, and so expandability of the portable computer is thus impaired. To compensate for the impaired expandability, the portable computer is typically provided with a docking station via which the portable computer may be connected with a mouse, a modem, and/or other peripheral equipment.

As disclosed in Taiwan Patent No. 568419, a docking station detachably connected to a bottom of a portable computer includes a base with a connector, and a cover. The cover is fixed to the base, and the connector extends outwardly from the cover to electrically connect with a socket on a bottom of the portable computer. Because the connector is installed in the cover of the docking station, the portable computer has to be manually moved to be attached to or detached from the docking station when in use, and vibration generated in attachment or detachment to or from the docking station may damage the portable computer.

What is needed, therefore, is a docking station removably connectable to a portable computer, without necessitating movement of the portable computer.

SUMMARY OF THE INVENTION

An exemplary docking station for a portable computer is provided. The docking station includes a connector and a keyboard. The connector is disposed on a bottom portion of the docking station for communicating with the portable computer, and the keyboard is disposed on a top portion of the docking station.

Other advantages and novel features will become more apparent from the following detailed description of a preferred embodiment when taken in conjunction with the accompanying drawings, in which:

DETAILED DESCRIPTION OF THE INVENTION

Figure 1:
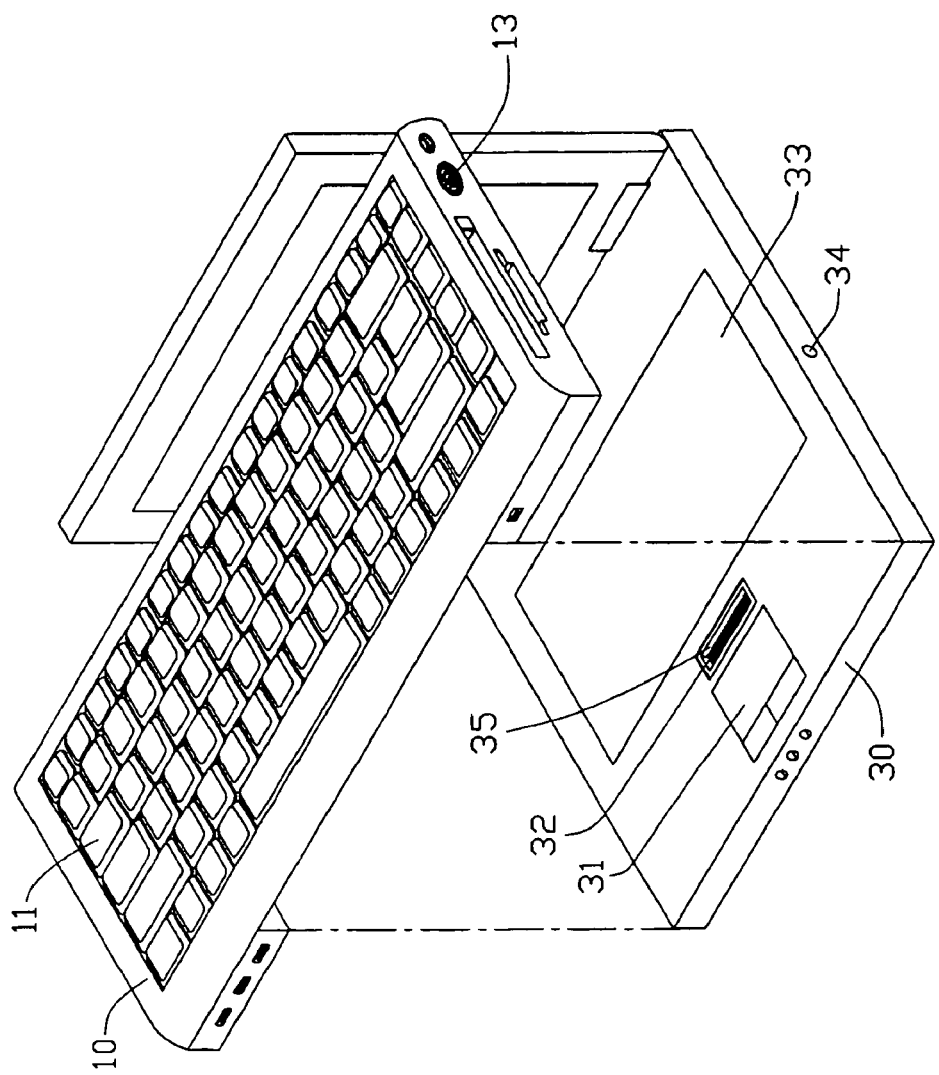
FIG. 1 is an exploded, isometric view of a docking station with a portable computer in accordance with a preferred embodiment of the present invention.

Referring to FIG. 1, a docking station 10 for a portable computer is provided in accordance with a preferred embodiment of the present invention. The portable computer includes a base unit 30.

A touch pad 31 and a keyboard 33 are disposed on a top portion of the base unit 30. A recess 35 is defined in the top portion between the touch pad 31 and the keyboard 33. A connector 32 is installed in the base unit 30, and exposed from the recess 35 of the top portion of the base unit 30. A fixing hole 34 is defined in a sidewall of the base unit 30.

Figure 2:
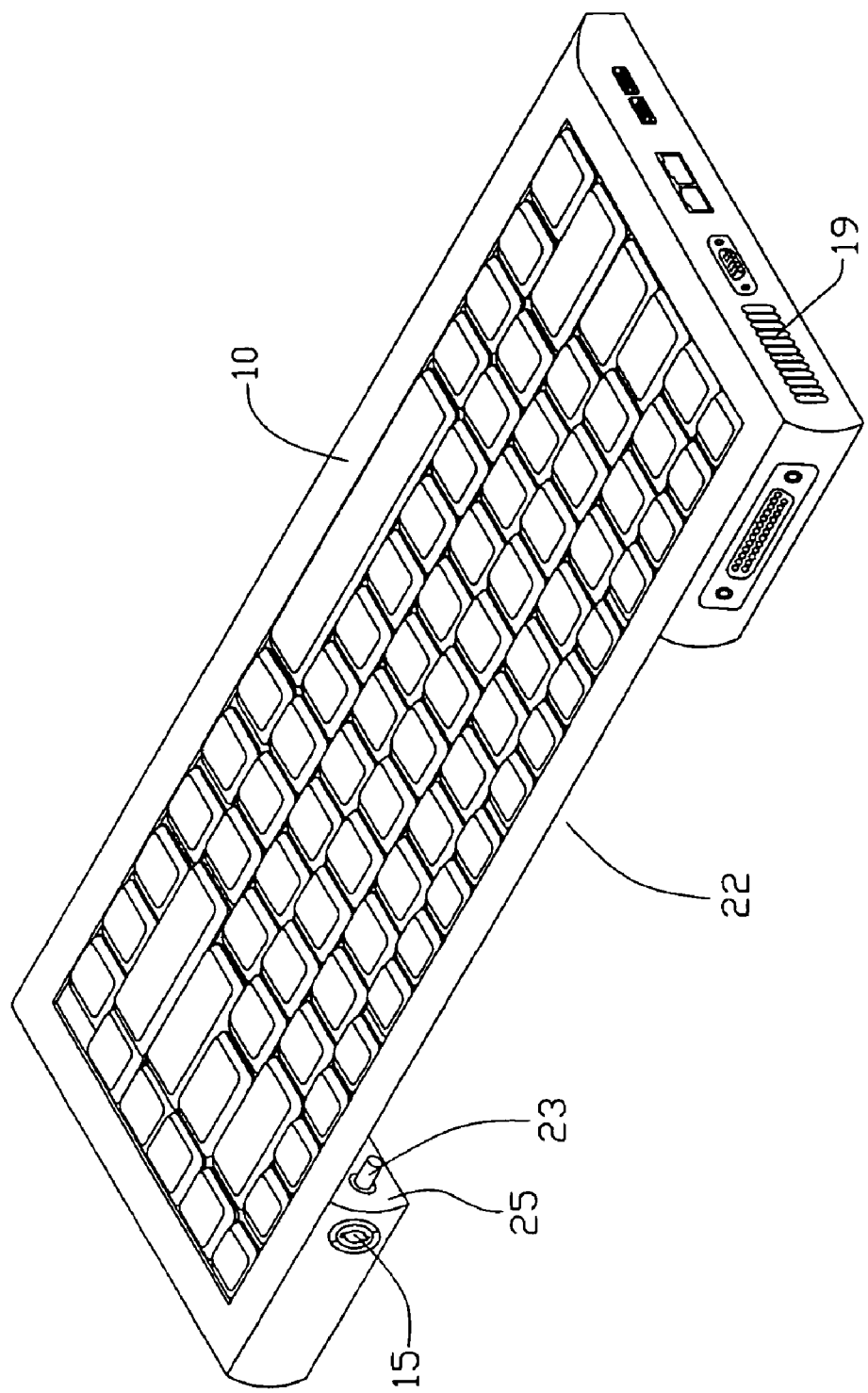
FIG. 2 is an isometric view of the docking station of FIG. 1, but viewed from another aspect.
Figure 3:
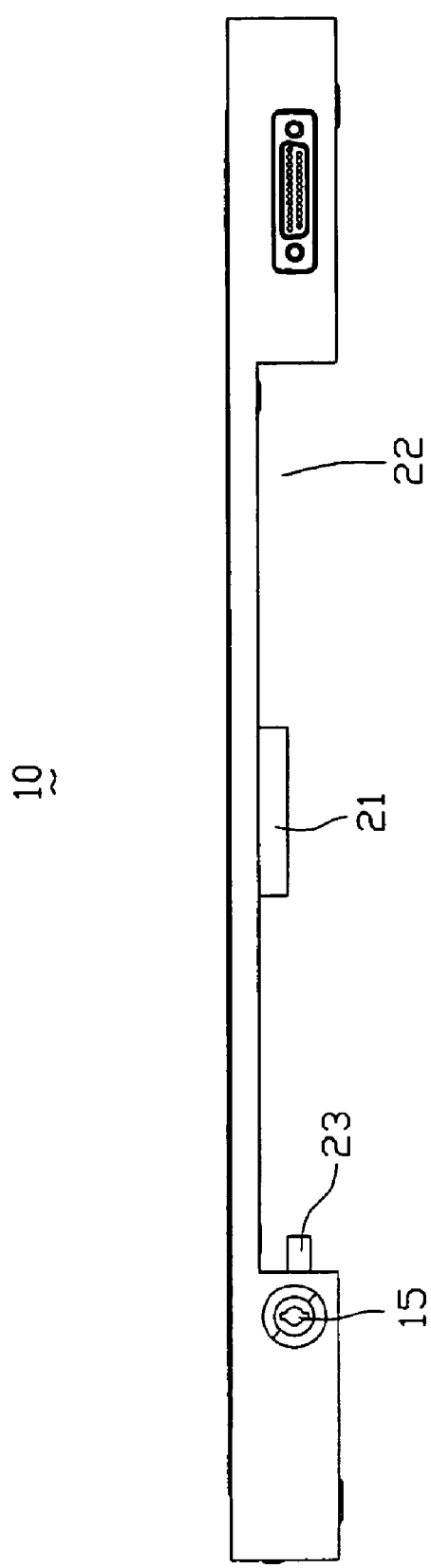
FIG. 3 is a rear elevational view of the docking station of FIG. 1.

Referring also to FIGS. 2 and 3, the docking station 10 defines a groove 22 in a bottom portion thereof, for receiving the top portion of the base unit 30. A sidewall 25 is formed in the bottom portion adjoining the groove 22, a fixing portion 23 protrudes from the sidewall 25 into the groove 22 adjacent a rear end of the docking station 10, and a switch 15 is mounted on the rear end for driving the fixing portion 23 to move out of and into the docking station 10. A connector 21 depends into the groove 22 from the docking station 20. A keyboard 11 is disposed on a top portion of the docking station 10. A plurality of ventilation holes 19, and a plurality of connector interfaces 13 for connecting peripheral equipment are formed in sidewalls of the docking station 10.

Figure 4:
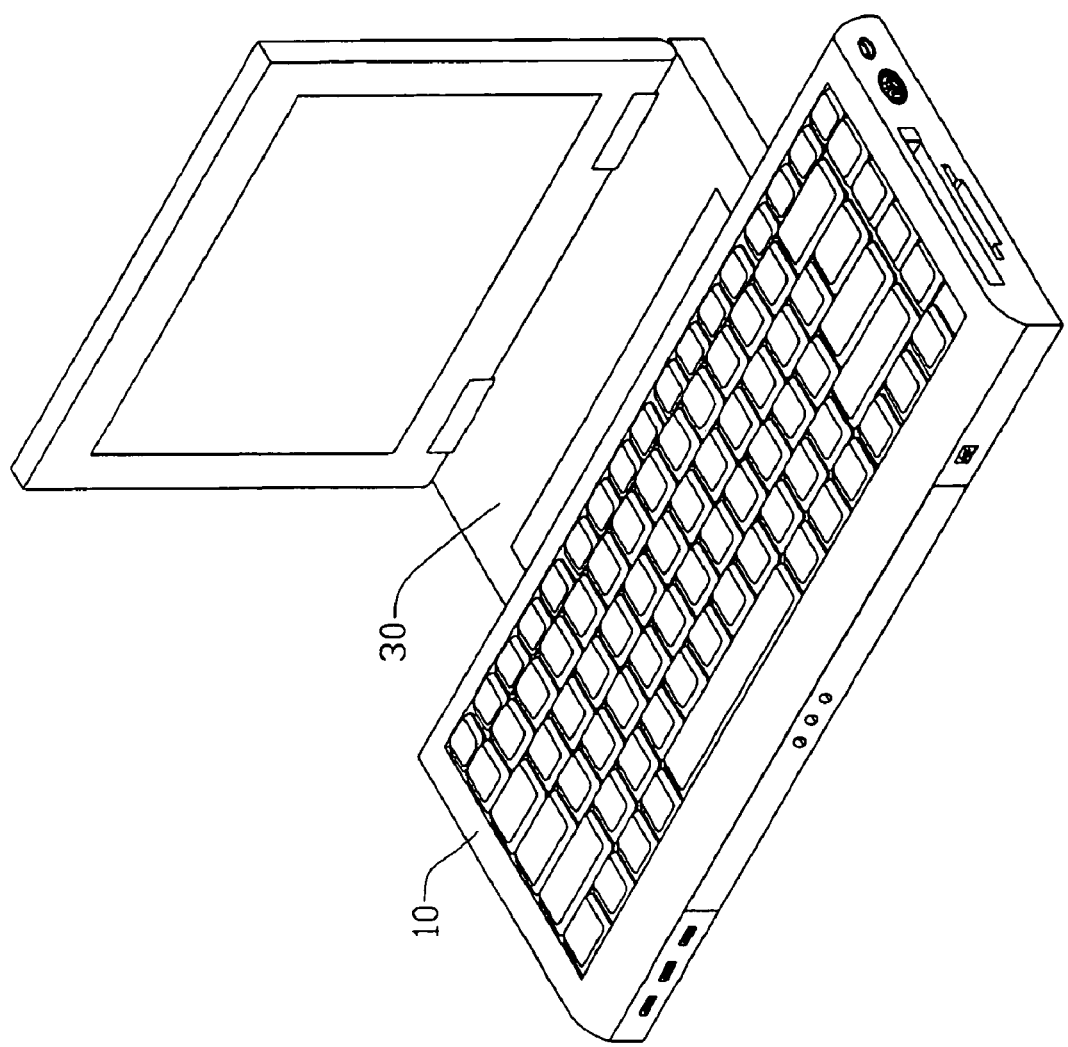
FIG. 4 is an assembled view of FIG. 1.

Referring also to FIG. 4, When in need of using the docking station 10 to achieve additional functions, the switch 15 is operated to retract the fixing portion 23 from the groove 22 into the docking station 10. The docking station 10 is placed on the base unit 30, and a part of the top portion of the base unit 30 is received in the groove 22 of the docking station 10. The connector 21 of the docking station 10 is inserted into the recess 35 and mated with the connector 32 of the base unit 30. The switch 15 is then manipulated to extend the fixing portion 23 outwardly into the fixing hole 34 of the base unit 30, thereby the docking station 10 is fixed to the base unit 30. Peripheral equipment can be connected with the docking station and thus communicate with the portable computer.

It is easy and safe to detach the docking station from the portable computer because the docking station is installed on the top portion of the base unit of the portable computer. Furthermore, when using the docking station 10, it is convenient to use the keyboard 11 on the docking station 10 to replace the keyboard 33 of the portable computer, which is covered by the docking station 10.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A docking station for a portable computer, the docking station comprising:
   a connector disposed on a bottom portion of the docking station configured for communicating with the portable computer; and
   a keyboard disposed on a top portion of the docking station.

2. The docking station as claimed in claim 1, wherein the bottom portion of the docking station defines a groove therein, for receiving a part of the portable computer.

3. The docking station as claimed in claim 2, wherein the connector depends into the groove from the docking station for electrically connecting with the portable computer.

4. The docking station as claimed in claim 1, wherein a movable fixing portion is installed in the docking station for holding the portable computer.

5. The docking station as claimed in claim 4, wherein a switch is mounted on the docking station for driving the fixing portion to move outward to and inward from the docking station.

6. The docking station as claimed in claim 1, wherein a plurality of expansion ports is disposed in sidewalls of the docking station configured for connecting peripheral equipment.

7. An assembly comprising:

a portable computer comprising a base unit and a display unit movably connected to the base unit, such that the display unit is movable between an open position and a closed position relative to the base unit, wherein the base unit comprises a top portion that is adjacent to the display unit when the display unit in the close position, a keyboard is disposed on the top portion of the base unit; and a docking station removably attached to the top portion of the base unit, the docking station comprising a keyboard functioning as an input device for the portable computer.

8. The assembly as claimed in claim 7, wherein a connector is installed in the top portion of the base unit, and a connector depends from a bottom portion of the docking station for mating with the connector of the base unit.

9. The assembly as claimed in claim 7, wherein a bottom portion of the docking station defines a groove therein, for receiving a part of the base unit.

10. The assembly as claimed in claim 9, wherein the base unit defines a fixing hole, the bottom portion of the docking station forms a sidewall adjoining the groove, and a movable fixing portion protrudes from the sidewall to engage in the fixing hole of the base unit.

11. The assembly as claimed in claim 10, wherein a switch is mounted on the docking station for driving the fixing portion to move outward to and inward from the sidewall.

12. The assembly as claimed in claim 7, wherein a plurality of expansion ports is disposed in sidewalls of the docking station configured for connecting peripheral equipment.

13. An assembly comprising:

a portable computer comprising a base unit, and a keyboard and a connector disposed on a top portion of the base unit; and a docking station removably attached to the top portion of the base unit, the docking station comprising a connector disposed on a bottom portion of the docking station and configured for mating with the connector of the base unit; the docking station comprising a docking station keyboard functioning as an input device for the portable computer.

14. The assembly as claimed in claim 13, wherein the bottom portion of the docking station defines a groove therein, for receiving a part of the base unit.

15. The assembly as claimed in claim 14, wherein the base unit defines a fixing hole, the bottom portion of the docking station forms a sidewall adjoining the groove, and a movable fixing portion protrudes from the sidewall to engage in the fixing hole of the base unit.

16. The assembly as claimed in claim 15, wherein a switch is mounted on the docking station for driving the fixing portion to move outward to and inward from the sidewall.

17. The assembly as claimed in claim 13, wherein a plurality of expansion ports is disposed in sidewalls of the docking station configured for connecting peripheral equipment.

\* \* \* \* \*